United States Patent [19]
Frederick

[11] Patent Number: 5,794,793
[45] Date of Patent: Aug. 18, 1998

[54] BICYCLE STORAGE RACK

[76] Inventor: Eddy R. Frederick, 2518 N. Wheatridge St., Wichita, Kans. 67223

[21] Appl. No.: 690,831

[22] Filed: Aug. 1, 1996

[51] Int. Cl.$^6$ .................................................. A47F 7/00
[52] U.S. Cl. .......................... 211/20; 211/17; 211/113; 248/339; 248/343
[58] Field of Search .................. 211/17, 20, 113, 211/118; 248/343, 317, 339, 201

[56] References Cited

U.S. PATENT DOCUMENTS

| | | | |
|---|---|---|---|
| 588,542 | 8/1897 | Williams | 211/17 |
| 4,015,811 | 4/1977 | Mute et al. | 248/343 |
| 4,086,480 | 4/1978 | Lahm | 248/343 X |
| 5,292,009 | 3/1994 | Smith | 211/20 |
| 5,460,274 | 10/1995 | Kramer | 211/17 |

FOREIGN PATENT DOCUMENTS 155887  4/1939  Germany ................... 211/17

*Primary Examiner*—Robert W. Gibson, Jr.
*Attorney, Agent, or Firm*—Edward L. Brown, Jr.

[57] ABSTRACT

An overhead bicycle storage rack for hanging a bicycle vertically between the ceiling joists of a building with sufficient headroom to walk thereunder, including a pair of U-shaped brackets, each bracket having a width approximate the spacing between ceiling joists and a depth approximate the radius of the bicycle wheel. Each bracket is positioned laterally between an adjacent pair of ceiling joists with the ends of the brackets attachable to the ceiling joists with the remainder of the bracket extending above the ceiling joists and a hanger element supported on each bracket for supporting an individual wheel of said bicycle.

7 Claims, 1 Drawing Sheet

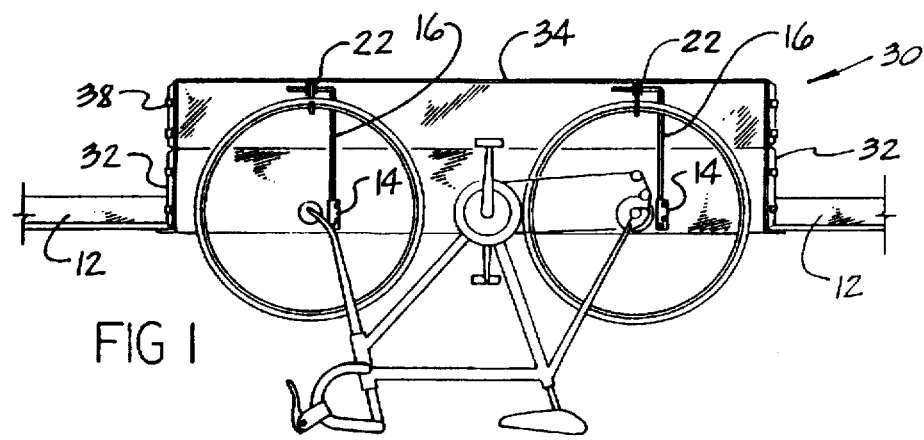
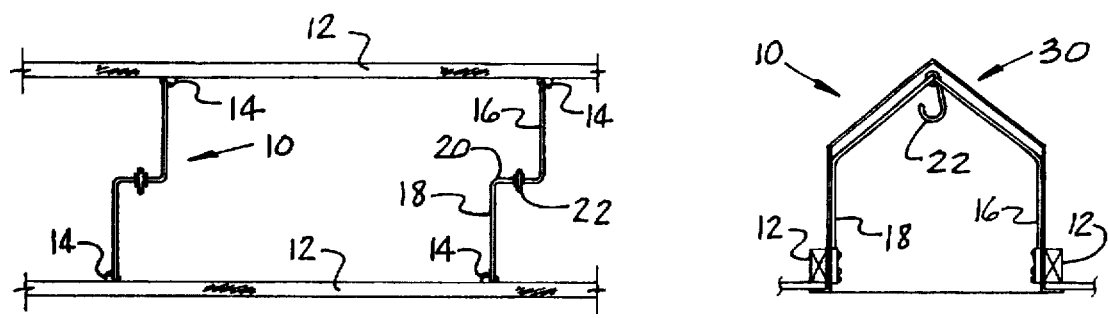
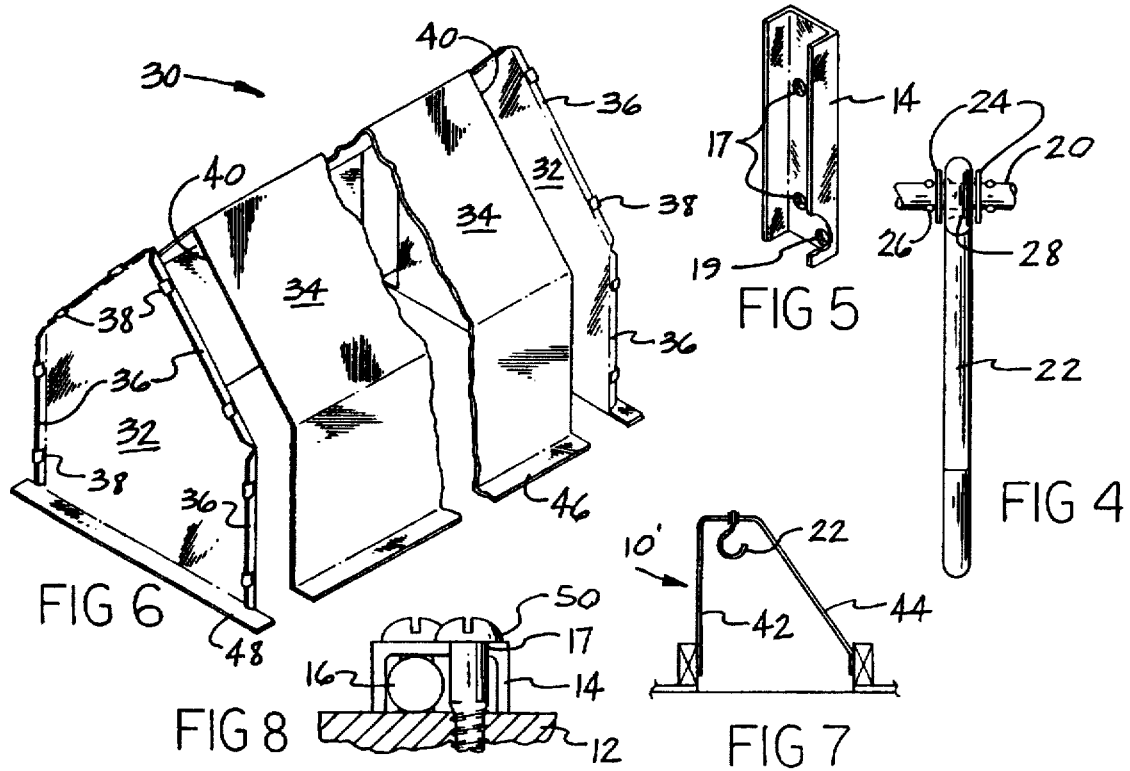

5,794,793

1

BICYCLE STORAGE RACK

BACKGROUND OF THE INVENTION

The invention relates to a bicycle storage rack and more particularly to an apparatus for suspending a bicycle vertically from the ceiling by brackets which extend upwardly between the ceiling joists or rafters so as to provide head clearance thereunder.

DESCRIPTION OF THE PRIOR ART

The storage of bicycles has been an ever present problem since their inception. Traditionally a garage or a storage shed has been the most convenient location. While most bicycles include extendable stands, storing on their stand takes up a great deal of space and therefore numerous ideas have been conceived over the years to store bikes in various places off the ground such as walls and ceilings.

The concept of storing a bicycle suspended from the ceiling on a rack is illustrated in U.S. Pat. No. 4,840,278.

U.S. Pat. No. 5,292,009 illustrates a wide variety of rack mountings on walls, ceilings and the floor in multiple arrangements, all intended to reduce the amount of space needed for storage.

Bicycles hung vertically from conventional height ceilings do not have sufficient head clearance to walk under them. U.S. Pat. No. 5,460,274 addresses the head clearance problem by storing the bicycle horizontally on three separate hooks.

SUMMARY OF THE INVENTION

The bicycle rack of the present invention stores the bicycle in an upside-down vertical hanging position with the wheels extending above the ceiling so that ample head room is available for a person walking thereunder. The bicycle is supported by a pair of u-shaped brackets having a hanger hook in the center thereof for engagement with the wheels of the bicycle. The ends of the bracket have a width spacing which is equivalent to the standard ceiling joist spacing. The bracket ends are attached to the inside surface of a pair of adjacent ceiling joists or rafters by a conventional channel-shaped mounting plate which transfers the hanging bicycle weight directly to the ceiling joists rather than the ceiling.

If the rack is being utilized in a garage having a ceiling, an enclosure is provided for the bicycle storage space above the ceiling. The enclosure can be non-structural having an open bottom with a periphery therearound which is attachable to the ceiling so that the space above the ceiling can be sealed off from the bicycle storage space which extends up through the ceiling.

It is therefore a principal object of the present invention to provide a bicycle storage rack which extends above the ceiling a distance sufficient to give ample head room clearance. Another object of the present invention is to provide an enclosure which forms the storage cavity above the ceiling which can be made from a non-structural material.

A further object of the present invention is to provide a bicycle storage cavity above the ceiling in the form of a metal enclosure with hangers supported by the enclosure.

A further object of the invention is to provide a bicycle storage rack which stores the bicycle out of the way while still being readily accessible.

BRIEF DESCRIPTION OF THE DRAWINGS

FIG. 1 is a side elevational view of the present invention in longitudinal section with a bicycle suspended therefrom;

2

FIG. 2 is a top plan view of the storage rack brackets as they are attached to the ceiling joists;

FIG. 3 is an end elevational view illustrating the support brackets for supporting the bike and the enclosure which surrounds the storage space for the bicycle;

FIG. 4 is an end view of a support hook to an enlarged scale with portions of the bracket broken away;

FIG. 5 is a perspective view of the mounting plate with portions broken away to show a mounting opening;

FIG. 6 is a perspective view of the storage space enclosure which is partially exploded and partially broken away;

FIG. 7 is an end elevational view of a modified form of the support bracket; and FIG. 8 is a sectional view of the mounting plate supporting the ends of the bracket to an enlarged scale.

DETAILED DESCRIPTION OF THE PREFERRED EMBODIMENT

Turning now to the drawing in which like reference characters indicate corresponding elements throughout all of the views, attention is first directed to FIG. 1 which generally illustrates the storage rack by reference numeral 11. The rack 11 comprises a pair of u-shaped brackets 10, as best seen in FIGS. 2 and 3, each of which supports the front and rear wheels of a bicycle respectively, with the bicycle 13 in an upside-down hanging position. Each bracket includes a hook element 22 for engaging the bicycle wheel. Each bracket 10 has two leg portions 16 and 18, as best seen in FIG. 2, joined by an offset center portion 20 which lies normal to the leg portions of the bracket. Attached to the center portion 20 is the hook 22, as best seen in FIG. 4. Both the brackets 10 and the hooks 22 are formed of heavy-gauged wire with sufficient strength to support the weight of any bicycle. Hook 22 is bent to form an eyelet end 28 which freely rotates on center portion 20 and is held in place by a pair of washers 24, which in turn have limited axial movement on center portion 20 by reason of deformations 26 on the rod which prevents the washers or the hook 22 from axial movement. The hook end 29 has a sufficiently large radius to easily engage the tire and rim of a bicycle. In viewing FIG. 1, which is in section, only the leg portion 16 of the bracket is illustrated while the other leg portion 18 of the bracket is offset to one side, as clearly seen in FIG. 2, and attached to ceiling joist 12 by mounting plate 14. By reason of the offset position of leg portion 16 and 18, the bracket is given added rigidity for any horizontal longitudinal loads.

The ends of leg portions 16 and 18 are attached to adjacent ceiling joists 12, as best seen in FIGS. 3, 5 and 8. The mounting plate 14 retains the end of leg 16 against the inside surface of joist 12, as seen in FIG. 8, by a pair of fasteners 50 which are positioned in holes 17, as seen in FIG. 5. Once fastener 50 is in place, the end of leg 16 is held snugly against joist 12 at two locations thus increasing the longitudinal horizontal load capacity of mounting plate 14. A third fastener or screw 51 is placed in hole 19 of mounting plate 14 thereby carrying an vertical load on leg 16.

While the rack can be used on a roof rafter without a ceiling, FIGS. 1 and 3 illustrate a sheet rock ceiling 15 supported by ceiling joists 12. While the use of enclosure 30 is optional, rooms with ceilings are typically insulated and it is desirous to have the storage cavity 31 enclosed.

Enclosure 30, as illustrated in FIGS. 1, 3 and 6, is fabricated from a non-structural lightweight corrugated board which might be either paper or plastic. Enclosure 30 includes two end sections 32 which connect to a longitudinal section 34 which is shaped to include vertical walls and a gabled top section which matches the shape of end sections 32. The end sections 32 include folded flanges 36 surrounding its contact area with longitudinal section 34 which flanges 36 are joined to the edges 40 of longitudinal section by a series of metal clips 38, well known in the art, for joining board structures of this nature. The open bottom of enclosure 30 also includes flanges 48 on the end sections and flanges 46 on the longitudinal bottom which provide a flange surrounding the perimeter of the bottom opening. These flanges 46 and 48 can be attached to the edges of the sheet rock ceiling surrounding the storage cavity 31 and fastened thereto by a variety of means such as staples, adhesives or a nailed trim strip, non of which are shown, however, they are all commonly used construction techniques well known in the art.

FIG. 7 illustrates a modified form of the present invention wherein the u-shaped bracket 10' includes a vertical leg 42 and an angled leg 44. In ceilings where ceiling joists are spaced on 16-inch centers rather than the standard 22-inch, this modified bracket 10' can be used with a more narrow storage cavity 31'.

While the enclosure 30 illustrated in the drawing is non-structural and does not carry a load, it could be fabricated from a structural material such as metal and the hooks 22 could be supported off of the enclosure itself and the brackets 10 would not be necessary. With a metal enclosure, the end sections as well as all of the other planar sections could be individual plates bolted together by conventional means with the hook members attached at the gable between the two flat sheets forming the gable. While FIG. 6 illustrates the longitudinal section 34 as one piece with numerous fold lines, if it was sheet metal it could be formed as two with a bolt joint along the gable.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims. The embodiments of the invention in which an exclusive property or privilege is claimed are defined as follows:

I claim:

1. An overhead bicycle storage rack for hanging a bicycle vertically between the ceiling joists of a building with sufficient head room thereunder, said rack comprising:

a pair of u-shaped brackets, each bracket having a width approximate the spacing between the ceiling joist and a depth approximate the radius of the bicycle wheel, each bracket is positionable laterally between an adjacent pair of ceiling joists;

each bracket having ends which are attachable to a ceiling joist with the remainder of the bracket exending above the ceiling joists; and a hanger element supported on each bracket positioned above the ceiling joist for supporting an individual wheel of said bicycle.

2. A bicycle storage rack as set forth in claim 1, including an open-bottomed enclosure means for enclosing the pair of brackets and the hanging bicycle; sealing means for attaching the periphery of the open bottom of the enclosing means to the adjacent ceiling and ceiling joist to seal the space above the ceiling.

3. A bicycle storage rack as set forth in claim 1, including an open-bottomed non-load bearing enclosure surrounding the storage space of the stored bicycle and the pair of brackets, the enclosure having a periphery around the open bottom and sealing means for attaching said periphery to the ceiling and to seal the space above the ceiling from that below the ceiling.

4. A bicycle storage rack as set forth in claim 1, including four mounting plates for retaining the ends of each bracket to the ceiling joists.

5. An overhead bicycle storage rack for hanging a bicycle vertically between the ceiling joists of a building with sufficient head room thereunder, said rack comprising:

an open-bottomed enclosure having a periphery therearound and a top defining a storage space capable of receiving at least a portion of a bicycle, the width of the enclosure being substantially the spacing between the ceiling joists;

attachment means for attaching the enclosure to a pair of adjacent ceiling joists; and a pair of hangers attached to the top of the enclosure for supporting each of the wheels of a bicycle in hanging relation.

6. An overhead bicycle storage rack for hanging a bicycle vertically between the ceiling joists of a building with sufficient head room thereunder, said rack comprising:

an open-bottomed enclosure having a periphey therearound and a top defining a storage space capable of receiving at least a portion of a bicycle, the width of the enclosure being substantially the spacing between the ceiling joists;

attachment means for attaching the enclosure to a pair of adjacent ceiling joists;

a pair of hangers attached to the top of the enclosure for supporting each of the wheels of a bicycle in hanging relation; and the periphery of the enclosure sealing the storage space from the area above the ceiling.

7. A bicycle storage rack, as set forth in claim 1, wherein the bracket includes two leg portions terminating in ends and an offset center portion which supports the hanger element.

* * * * *